(12) United States Patent
Smith et al.

(10) Patent No.: US 6,602,610 B2
(45) Date of Patent: *Aug. 5, 2003

(54) MOLDED WOOD COMPOSITES HAVING IMPROVED HORIZONTAL CONTACT NESTING PROFILE

(75) Inventors: Darrell M. Smith, Columbia Cross Roads, PA (US); William E. Rinker, Towanda, PA (US)

(73) Assignee: Masonite Corporation, Tampa, FL (US)

( * ) Notice: Subject to any disclaimer, the term of this patent is extended or adjusted under 35 U.S.C. 154(b) by 8 days.

This patent is subject to a terminal disclaimer.

(21) Appl. No.: 09/803,872

(22) Filed: Mar. 12, 2001

(65) Prior Publication Data

US 2001/0026862 A1 Oct. 4, 2001

Related U.S. Application Data

(63) Continuation-in-part of application No. 09/151,985, filed on Sep. 11, 1998, now Pat. No. 6,200,687.

(51) Int. Cl.[7] .............................. B32B 21/04; E04L 2/54; B29C 59/00
(52) U.S. Cl. .................... 428/537.1; 428/109; 428/156; 428/171; 428/212; 428/213; 264/112; 264/113; 264/316; 264/52; 264/784.1
(58) Field of Search ................................ 428/109, 141, 428/151, 161, 156, 187, 326, 525, 537.1, 542.2, 171, 213; 52/784.1; 264/112, 113, 119, 128, 162, 316; 144/320, 328; 156/62.2, 209, 219, 220, 279, 289, 323

(56) References Cited

U.S. PATENT DOCUMENTS

| | | |
|---|---|---|
| 2,343,740 A | 3/1944 | Birmingham ................. 154/40 |
| 2,831,793 A | 4/1958 | Elmendorf .................. 154/45.9 |
| 3,098,781 A | 7/1963 | Greten ........................ 156/373 |
| 3,308,013 A | 3/1967 | Bryant ........................ 162/103 |
| 3,639,200 A | 2/1972 | Elmendorf et al. .......... 161/116 |
| 3,796,586 A | 3/1974 | Hanlon et al. ................. 117/8 |

(List continued on next page.)

FOREIGN PATENT DOCUMENTS

| | | |
|---|---|---|
| EP | 0688639 | 12/1995 |
| EP | 0747291 | 12/1996 |

Primary Examiner—Donald J. Loney
(74) Attorney, Agent, or Firm—Liniak, Berenato & White, LLC (57) ABSTRACT

A molded wood composite article man-made from wood fibers or wood particles on at least an upper, molded surface of the article, and a method of manufacturing the article to include a relatively uniform density, detailed design contours and textured aesthetics on one or more molded depression-interior inclined surfaces, while preventing embrittlement, softness and blistering of the article along the depression-interior inclined surfaces. These attributes are achieved by molding one or more depressions into an initially planar layer of cellulosic material, wherein the molded depressions have a length to depth ratio in the range of about 5.0 to about 8.5, and have one or more inclined walls that have upper surfaces, along essentially an entire inclined span, that include detailed design contours, including adjacent curved and planar portions, e.g., bead and cove. The inclined depression-interior molded walls, having upper surfaces that include the adjacent curved and planar contours, have a thickness or caliper measurement, measured normal to a tangent at any point along the upper (finished) contoured surface, that is smaller than the caliper so measured at horizontal, distal ends that are integral with the depression-interior contoured, inclined surface span, to make sure that the inclined surfaces of adjacent, stacked articles do not contact each other during shipping.

32 Claims, 5 Drawing Sheets

U.S. PATENT DOCUMENTS

| | | | |
|---|---|---|---|
| 4,246,310 A | 1/1981 | Hunt et al. | 428/106 |
| 4,248,163 A | 2/1981 | Caughey | 108/53.3 |
| 4,361,612 A | 11/1982 | Shaner et al. | 428/106 |
| 4,364,984 A | 12/1982 | Wentworth | 428/106 |
| 4,610,900 A | 9/1986 | Nishibori | 428/15 |
| 4,610,913 A | 9/1986 | Barnes | 428/215 |
| 4,622,190 A | 11/1986 | Schultz | 264/119 |
| 4,720,363 A | 1/1988 | Mayumi et al. | 264/26 |
| 4,830,929 A | 5/1989 | Ikeda et al. | 428/542.8 |
| 4,942,084 A | 7/1990 | Prince | 428/284 |
| 5,401,556 A | 3/1995 | Ishitoya et al. | 428/109 |
| 5,443,891 A | 8/1995 | Bach | 428/182 |
| 5,470,631 A | 11/1995 | Lindquist et al. | 428/105 |
| 5,543,234 A | 8/1996 | Lynch et al. | 428/537.1 |
| 6,200,687 B1 * | 3/2001 | Smith et al. | 428/109 |

* cited by examiner

FIG. 3A
6.2 Ratio

FIG. 4B 8.2 RATIO

FIG. 5

MOLDED WOOD COMPOSITES HAVING IMPROVED HORIZONTAL CONTACT NESTING PROFILE

CROSS REFERENCE TO RELATED APPLICATION

This application is a continuation-in-part of application Ser. No. 09/151,985, filed Sep. 11, 1998, now U.S. Pat. No. 6,200,687.

FIELD OF THE INVENTION

The present invention relates to a molded wood composite article, containing one or more molded depressions, and a method of making the molded wood composite article, having an inclined profile embossed or molded into a depression-interior portion of the article. More particularly, the molded wood composite article of the present invention is made from a combination of cellulosic material, such as cellulosic fibers or cellulosic particles, and a natural or synthetic binder, such as a phenol formaldehyde or urea formaldehyde resin, including at least about 80% cellulosic material, and molded from a mat having at least an upper surface formed from refined, fibrillated cellulosic fibers, e.g., a fiberboard mat, such as hardboard; or made from cellulosic particles, such as particle board. The major surfaces of the articles are molded from a planar layer of cellulosic material, e.g., a fiberboard mat, made either by the wet process or the dry process, preferably the dry process; or made from a layer of cellulosic particles and a resin binder. The planar layer of cellulosic material is molded when the cellulosic layer contains less than about 10% moisture, based on the dry weight of the cellulosic layer, regardless of the method of making the cellulosic layer. Essentially no gas venting is required until the molding operation is complete and the mold is opened. The depression-interior inclined molded profile does not blister, has relatively constant paint holdout, and provides better nesting, one article on another, whereby adjacent articles contact only on horizontal surfaces at distal ends of the depression-interior inclined molded profile, and not on the inclined profile, for shipping and storage without damage.

BACKGROUND OF THE INVENTION

Man-made boards, such as fiberboard, e.g., hardboard; chipboard; oriented strand board-fiberboard composites; particle board; oriented strand board-particle board composites; and the like, commonly are embossed on their intended visible major surface in the manufacture of interior panelling, exterior siding, and particularly in the manufacture of door skins that are laminated to a support structure or frame, on both major surfaces, for replicating multi-panel doors having surfaces that are man made, rather than the very expensive natural wood "6-panel" doors. Commonly, such articles are molded from a planar cellulosic mat to include one or more interior or "closed" depressions, within an interior of the article, such as one or more square or rectangular depressions that do not extend to an outer edge of the article.

The cellulosic fibers or particles used to form the loose mat, e.g., a two inch thick layer of cellulosic fibers, initially may be bone dry after the fibers have been dried and felted, but the cellulosic materials in such mats absorb moisture from the atmosphere and generally include about 2% to about 10% moisture when molded via hot pressing, depending upon the humidity in the region where such mats are stored and/or manufactured. A molded or embossed design in a layer of cellulosic material that leaves interior depressions in the molded article is difficult to provide without surface defects because gases formed during hot-pressing, e.g., vaporized moisture, cannot escape from the mold cavity via venting to an exterior edge of the molded article when the molded article is hot-pressed to a constant mold level completely surrounding the formed interior depressions.

In some mold designs formed in wood composites, venting is accomplished by disposing a gas pervious material, e.g., a temperature-resistant, gas-pervious fabric, between a back half of the mold cavity and a non-visible side of the product being molded, to achieve controlled gas venting without blister formation in the molded article. Controlled gas venting during the hot-press molding of wood composite articles, however, tends to disrupt the complete consolidation and bonding of the molded articles along the molded edges, due to the escape of gas at the edges, causing excessive scrap or wasted material. Wasted material results from trimming the incompletely consolidated edges, containing valuable cellulosic material and binder, which must be trimmed away to achieve solid, completely consolidated, scratch resistant man-made board material over the entire major, exterior surface of the trimmed molded article. Accordingly, when such waste cannot be tolerated, a mechanical dam is included, surrounding the mold cavity, to eliminate essentially all gas venting during the hot-press molding step to avoid "punky" edges that end up as waste.

A typical mechanical mold dam is a metal border extending from, and perpendicular to, one half of the mold or die, and extending, for example, 0.030 inch vertically toward the other half of the mold or die, to create sufficient pressure on the material being molded, completely surrounding the mold cavity, to prevent essentially all gas escape until the mold cavity is opened. Gas venting, when such mechanical dams are used, occurs almost exclusively as a result of opening the mold cavity upon completion of the hot-press molding step. The sudden reduction in pressure upon mold cavity opening, however, sometimes causes a sudden release of water vapor trapped beneath the upper surface of the molded article, thereby causing a portion of the visible molded surface to bubble or blister—a portion of the molded surface delaminates from the remaining thickness because of the sudden escape of gas from an interior portion of the molded article. This blistering problem is most severe when attempting to mold detailed designs onto an inclined interior surface portion of closed depressions molded into wood composites.

Other problems occur in attempting to form the above-described inclined molded portions on an interior surface of closed depressions in a molded wood composite article, particularly when it is commercially necessary to paint such inclined surfaces to provide an aesthetically pleasing outer surface. One type of product, in particular, that must include excellent embossing detail and superior aesthetic qualities to be commercially acceptable, is a door skin that simulates a multi-panel natural wood door on both major faces of a support substrate or frame member. Door skins, or door faces, require detailed, inclined interior molded walls having a plurality of relatively close contours that include varied curves and planar surfaces. It has been found that these interior, inclined molded surfaces of interior inclined molded depression walls are very difficult to paint uniformly due to density differences, because of various curved and planar adjacent contours and due to the confined locations of the inclined surfaces within the relatively small, molded depressions. These angled or inclined surfaces on wall portions molded into depressions formed in the interior of the product are extremely difficult to provide with embossed surfaces representing, for example, a wood grain pattern, since such embossed texture on depression-interior inclined walls have a tendency to cause the article to stick to the mold cavity at the embossed inclined wall, causing fiber to pull away from the surface of the molded article when it is removed from the mold cavity.

Another problem common to the molded wood composite articles described above is in stacking a plurality of the molded articles for efficient shipping. Door skins, for example, when stacked one above another, having a "bed and cove" depression profile, have a tendency to damage, particularly in the upper decorative surface of the lowermost articles, due to abrasive contact on the detailed depression-interior inclined surfaces, particularly on the convex, uppermost "bead" of a "bead and cove" Colonist® design, where aesthetics are most important, and where damage is most apparent.

The molded wood composite articles of the present invention solve some or all of the above-mentioned deficiencies in prior art molded wood composite articles to provide a molded wood composite article that has inclined, decorative depression-interior molded walls having upper, decorative inclined surfaces of relatively uniform density; can be painted with uniform paint hold-out; has molded, inclined surfaces that are accessible for buffability, in the preferred embodiment; and wherein the molded, inclined depression-interior surfaces are capable of being embossed with excellent texture or grain detail to provide an extremely aesthetic, detailed texture or grain design.

One patent, assigned to the Assignee of this application, Lynch, et al. U.S. Pat. No. 5,543,234, solves the above-mentioned deficiencies in the molded, inclined depression-interior surfaces, but the inclined surfaces are molded such that when stacked, one article above another, the inclined surfaces, at the ovolo or rounded areas, are in contact with the ovolo areas in an undersurface of an adjacent article. It has been found that such contact of stacked articles at rounded areas does not cause product damage so long as the mold core and mold cavity used to form the articles are exactly aligned during the formation of each article. However, if the mold core and mold cavity are not exactly aligned during product manufacture, the stacked articles are skewed from vertical, causing excessive loads on product ovolo areas, with subsequent cracking and scuffing at ovolo surfaces, where greatest aesthetics are required. The inclined, depression-interior walls of the articles of the present invention include a profile in the depression-interior, inclined molded surfaces such as an embossed "bead and cove" design, that permits excellent stacking of the articles for efficient, and essentially damage-free shipping and storage, without any contact at the ovolo or rounded areas, while stacking more articles, one upon another, even if the mold core and mold cavity are misaligned during product formation. Damage-free stacking is achieved by providing a profile such that adjacent stacked articles are in contact only at horizontal, distal ends of the inclined molded surfaces, but adjacent, stacked, inclined and rounded molded surfaces do not make contact with each other during shipping, and are spaced at least 0.004 inch over the entire inclined wall span.

SUMMARY OF THE INVENTION

In brief, the present invention is directed to a molded wood composite article man-made from wood fibers or wood particles on at least an upper, molded surface of the article, and a method of manufacturing the article to include a relatively uniform density, detailed design contours and textured aesthetics on one or more molded depression-interior inclined surfaces, while preventing embrittlement, softness and blistering of the article along the depression-interior inclined surfaces. These attributes are achieved by molding one or more depressions into an initially planar layer of cellulosic material, wherein the molded depressions have one or more inclined walls that have upper surfaces, along essentially an entire inclined span, that include detailed design contours, including adjacent curved and planar portions, e.g., bead and cove. The inclined depression-interior molded walls, having upper surfaces that include the adjacent curved and planar contours, have a thickness or caliper measurement, measured normal to a tangent at any point along the upper (finished) contoured surface, that is smaller than the caliper so measured at horizontal, distal ends that are integral with the depression-interior contoured, inclined surface span, to make sure that the inclined surfaces of adjacent, stacked articles do not contact each other during shipping.

It has been found that the thickness or caliper along the entire span of contoured inclined depression-interior molded walls of a wood composite article, molded in accordance with the present invention, should be molded to be about 2% to about 15% thinner, preferably about 3% to about 10% thinner, and more preferably about 5% to about 8% thinner, than a thickness of adjoining horizontal portions at distal ends of the inclined walls of the wood composite articles.

It is apparent to those skilled in the art that the articles described herein can be formed from materials other than cellulosic materials, e.g., polymeric or plastic articles, while advantageously including one or more interior, inclined walls having a thickness that is smaller over the entire span of the inclined walls than the adjoining, integral, horizontal portions at the distal ends of the inclined, depression-interior molded walls of the article. Such an article, regardless of the material used to form the article, will nest, one article above another, without contact against the inclined, interior molded walls of the stacked articles for storage and transport without any surface scratching or other surface damage.

Accordingly, one aspect of the present invention is to provide a molded, wood composite article, and method of manufacturing the article, that includes interior molded depressions having an inclined, decorative surface that has a relatively uniform density along the entire inclined surface, which is not brittle or blistered as a result of the molding process, and such that the articles can be stacked, one upon another, without contacting adjacent articles at the inclined, depression-interior walls.

Another aspect of the present invention is to provide a molded, wood composite article, and method of manufacturing the article, containing at least about 80% cellulosic material, that is molded from an incompletely consolidated planar mat or preform using heat and pressure to include a decorative inclined surface in a molded depression within the interior of the article, wherein the inclined surfaces do not contact each other when a plurality of articles are stacked, one above another.

Still another aspect of the present invention is to provide a molded man-made wood composite article that includes a molded depression that includes adjacent curved and planar surfaces, e.g., "bead and cove" on a depression-internal inclined surface, preferably having an inclination of about 10° to about 40°, preferably about 15° to about 30° from a horizontal lower surface integral with a lower end of the inclined wall, that nests with a molded inclined wall under-surface of an identical wood composite article, without contact at the inclined walls, for storage and shipping without damage to the inclined surfaces; and wherein the inclined surfaces have a uniform paint-holdout capability and are easily embossed with a texture or other decorative design, e.g., simulating wood grain.

Another aspect of the present invention is to provide a decorative article of manufacture, that may be formed from plastic, or other non-wood material, that includes a depression having an interior inclined wall that will not contact an undersurface of an interior, inclined wall of an identical article stacked above to prevent damage of the inclined walls of the stacked, molded articles during shipping.

Still another aspect of the present invention is to provide a molded, man-made wood composite article, and method of making the article, that includes one or more interior molded depressions, wherein the depression has a length to depth ratio in the range of about 5.0 to about 8.5, preferably about 5.2 to about 8.2, more preferably about 5.2 to about 7.2, most preferably about 5.2 to about 6.2.

The above and other aspects and advantages of the articles and methods of the present invention will become more apparent from the following detailed description of the preferred embodiments, taken in conjunction with the drawings.

DETAILED DESCRIPTION OF THE PREFERRED EMBODIMENTS

Figure 1:
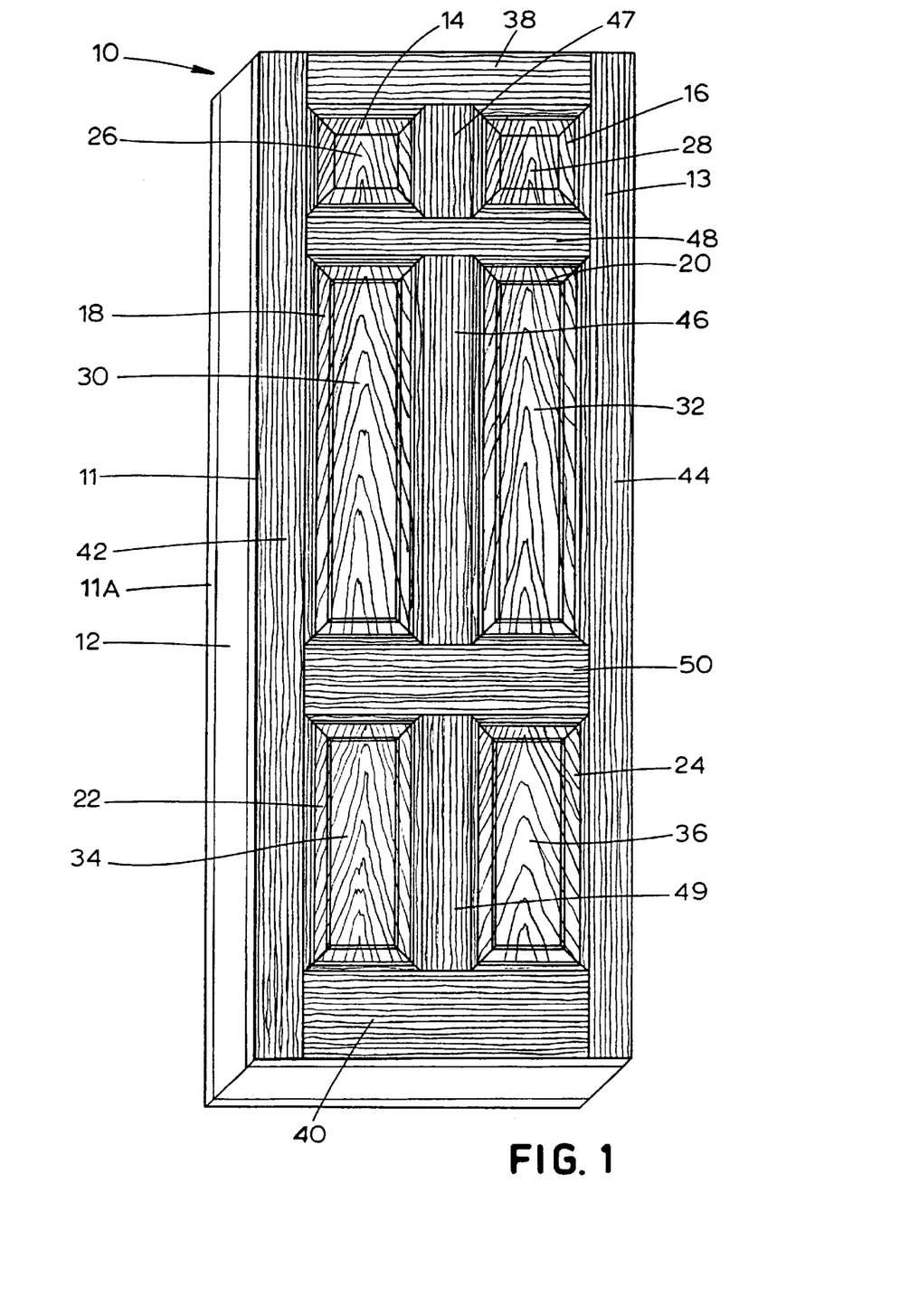
FIG. 1 is a perspective view of a door manufactured to include two laminated door skins on the major outer surfaces, the entire door, or at least each door skin, being manufactured in accordance with the principles of the present invention.

In the preferred embodiments shown in the drawings, the molded wood articles of the present invention are molded in the form of a multi-panel door, or, more preferably, as a thin door skin to be laminated or otherwise adhered to a core, frame or support substrate, on both major surfaces, to simulate a solid, natural wood door, e.g., an interior or exterior passage door, as shown in FIG. 1, or a cabinet door. It should be understood, however, that the principles of the present invention apply to much more than the manufacture of doors or door skins and apply to any molded man-made composite wood article that includes one or more depression-interior walls that have an inclined, contoured decorative surface extending within the depression and adjacent to a thicker planar, e.g., horizontal, surface portion of the molded article. Examples of other composite, molded wood articles that are capable of being manufactured in accordance with the principles of the present invention include decorative hardboard; interior and exterior siding; decorative interior wall panelling; structural cores; roofing material; crating structures; and the like.

A surface portion of the articles of the present invention should be formed from cellulosic material, such as fibrillated cellulosic fibers, or cellulosic particles and a binder capable of adhering the cellulosic material together into a structurally stable article. The cellulosic fibers, whether in the form of refined, fibrillated fibers, or in the form of discrete particles, can be molded and adhered together with natural or synthetic binders to provide aesthetically pleasing contours and texture in all exterior, visible surfaces, including the depression-interior inclined wall surfaces. The articles of the present invention can be molded as a thin, e.g., 0.1 to 0.2 inch thick door skin, or the articles can be molded together with an underlying core material, such as an oriented strand board, particle board, plywood, wafer board, or a thermoplastic or thermosetting plastic core material by molding the face or skin cellulosic material together with the underlying core material. The following U.S. patents are hereby incorporated by reference as examples of various different cores, having cellulosic fibers or particles as a surface layer, that are suitable for molding in accordance with the present invention: Lynch, et al. U.S. Pat. No. 5,543,234; Shaner, et al. U.S. Pat. No. 4,361,612; Wentworth U.S. Pat. No. 4,364,984; Greten U.S. Pat. No. 3,098,781; Birmingham U.S. Pat. No. 2,343,740; Bryant U.S. Pat. No. 3,308,013; Elmendorf U.S. Pat. No. 2,831,793; Hunt, et al. U.S. Pat. No. 4,246,310; and Barnes U.S. Pat. No. 4,610,913. Alternatively, a thin cellulosic molded surface layer can be molded separately, in accordance with the present invention, and later laminated to a support structure.

Turning now to the drawings, and initially to FIG. 1, there is illustrated a door, generally designated by reference numeral 10, shown horizontal, as molded, that includes an upper door skin 11, and an identical, lower door skin 11A secured to opposite major surfaces of a door frame or interior support structure 12. The door skins 11 and 11A can be molded separately to impart aesthetic surface contours in the visible outer surfaces that correspond to contours essentially identical to contours of a mold cavity (not shown). The door skins 11 and 11A then can be secured, e.g., adhesively, to a suitable core or frame structure 12. The lower half of the mold cavity, if shown, would be essentially the same in general contour to an upper surface 13 of the door skin 11, except that the lower mold half would be slightly larger horizontally, in the depression dimensions, to allow for the thickness of the molded cellulosic material forming the door skin. The upper mold half (not shown) is dimensioned complementary to the upper surface 13 of the door skin, and includes raised mold portions dimensioned to correspond to the depressions shown in the upper surface 13 of door skin 11.

The door skins 11 and 11A are molded with the mold cavity or die halves disposed in a generally horizontal disposition so that the upper major surface 13 will be described as horizontal-corresponding to its disposition during molding—and it will be recognized that the position of the molded article, in use, may very well be opposite, as in the case of door skins 11, where the molded major surface 13 normally would be disposed in a vertical orientation. The exemplary door skins, e.g., 11, shown in FIG. 1, are molded to simulate a multi-panel door surface, and the preferred embodiment shown in FIG. 1 contains six molded depressions 14, 16, 18, 20, 22 and 24, surrounding six panels 26, 28, 30, 32, 34 and 36. Further, each depression is completely surrounded by planar, e.g., horizontal door surface portions 38, 40, 42, 44, 46, 47, 48, 49 and 50, lying in a common plane.

In the preferred 6-panel door skins 11 and 11A shown in FIG. 1, the depressions 14, 16, 18, 20, 22, and 24 are rectangular in shape and the rectangular depressions completely surround the horizontal door panels 26, 28, 30, 32, 34 and 36 that lie in the same horizontal plane as the horizontal door surface portions 38, 40, 42, 44, 46, 47, 48, 49 and 50.

Figure 2A:
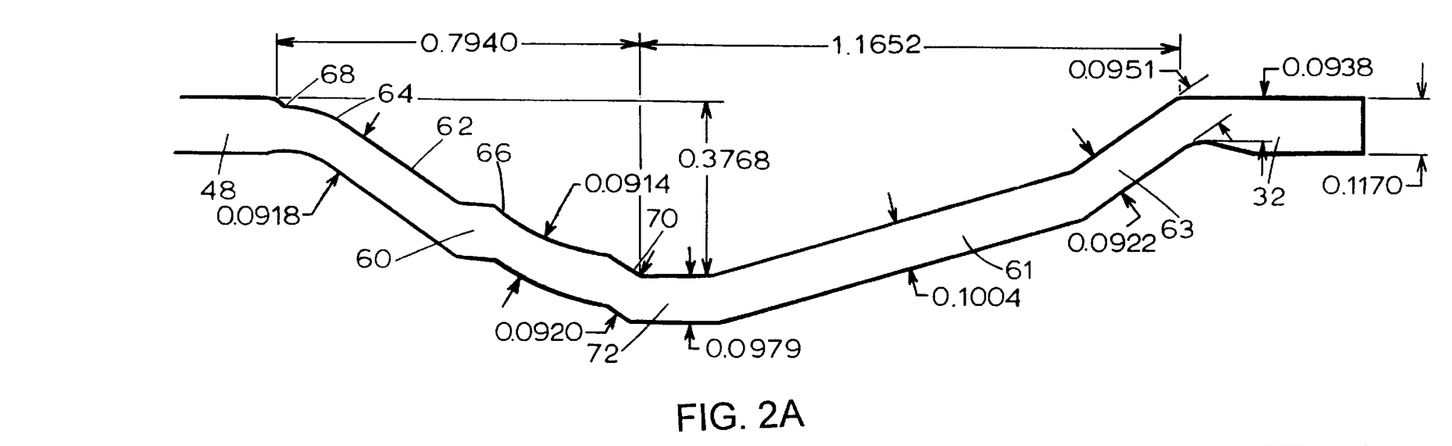
FIG. 2A is a side (profile), partially broken-away view of a preferred embodiment of a molded depression, taken along the line 2A—2A of FIG. 3, that includes a depression length to depth ratio of 5.2, and an interior inclined wall having curved and planar contours in its surface, forming a portion of the article of FIG. 1.

The rectangular molded depressions 14, 16, 18, 20, 22, and 24, are molded to include depression-interior inclined walls having upper surfaces that, in accordance with the present invention, are molded to a relatively constant density and include contours, preferably over the full span of the depression-interior inclined wall surfaces, that extend downwardly and inwardly from a thicker planar, e.g., horizontal, surface portion (38, 40, 42, 44, 46, 47, 48, 49 and/or 50) of the door skin 11 to a lower end of the depression-interior inclined wall surface, at or near a lowermost end of the depression, as will be described in more detail with reference the depression profile shown in FIG. 2A.

In accordance with one embodiment of the present invention, instead of molding two relatively thin, e.g., about ⅛ inch, door skins 11 and 11A separately and then securing the door skins on opposite major surfaces of a door frame or other support structure 12, the support structure 12 can be disposed between the two door skins 11 and 11A, in the mold cavity, to consolidate the upper and lower layers that form the door skins 11 and 11A under heat and pressure, while simultaneously bonding the door skins to the support structure 12, in a single molding step. In this manner, a separate bonding step for securing the door skins 11 and 11A to the support structure 12 is not needed, while forming a strong bond between the skins 11 and 11A and the support structure via resin binder included in the cellulosic layers 11 and 11A surrounding the support structure 12. In this embodiment, other decorative products can be made, other than door skins, and the support structure 12 can be a cellulosic material, e.g., an oriented stand board or fiberboard, or a plastic material, e.g., foamed or solid polymer, e.g., thermoplastic or thermosetting polymer, that will yield at its major surfaces to receive the molded depressions formed in the door skins 11 and 11A.

Turning first to the preferred embodiment of the depression profile shown in FIG. 2A, depression 20, and preferably each other depression 14, 16, 18, 22 and 24, is molded to include a depression-interior inclined walls 60 and 61 that are thinner along their entire span than the thickness of the adjacent, integral horizontal portions 48 and 32, respectively. The inclined wall 60 has a contoured upper surface 62, preferably including a bead or curved contour 64, and a planar or cove contour 66. The contoured, decorative depression-interior wall surface 62 preferably extends from an upper end 68 to a lower end 70 of the inclined wall 60. The upper end 68 of the inclined wall 60 is integral with the planar door surface portion 46, and the lower end 70 of the inclined wall 60 is integral with a planar, e.g., horizontal, lowermost wall 72 forming a bottom wall of the depression 20. Lowermost wall 72 joins panel 32 via upwardly sloped walls 61 and 63.

The inclined depression-interior molded wall 60 having an upper surface that includes the adjacent curved contour 64 and planar contour 66, has a thickness or caliper measurement, measured normal to a tangent at any point along the upper (finished) contour surface 62, that is thinner than the horizontal portions 48 and 32 of the article—the horizontal portions 48 and 32 being integral with and at distal ends of the inclined wall portions 60 and 61, respectively. The upper surface 62 of the inclined wall 60 should include detailed, adjacent curved 64 and planar 66 surfaces, e.g., a "bead and cove" molded pattern.

The profile of the prior art depression of the Lynch, et al. U.S. Pat. No. 5,543,234 has a weakness that the depression profiles of FIGS. 2A, 3A and 4A eliminate. The Lynch et al. '234 patent does not allow efficient nesting of the products in stacking, handling, and shipping, because when stacked, contact is made on an upper surface 62 of the bead and cove Colonist design by an undersurface of an identical article stacked thereabove.

Figure 3A:
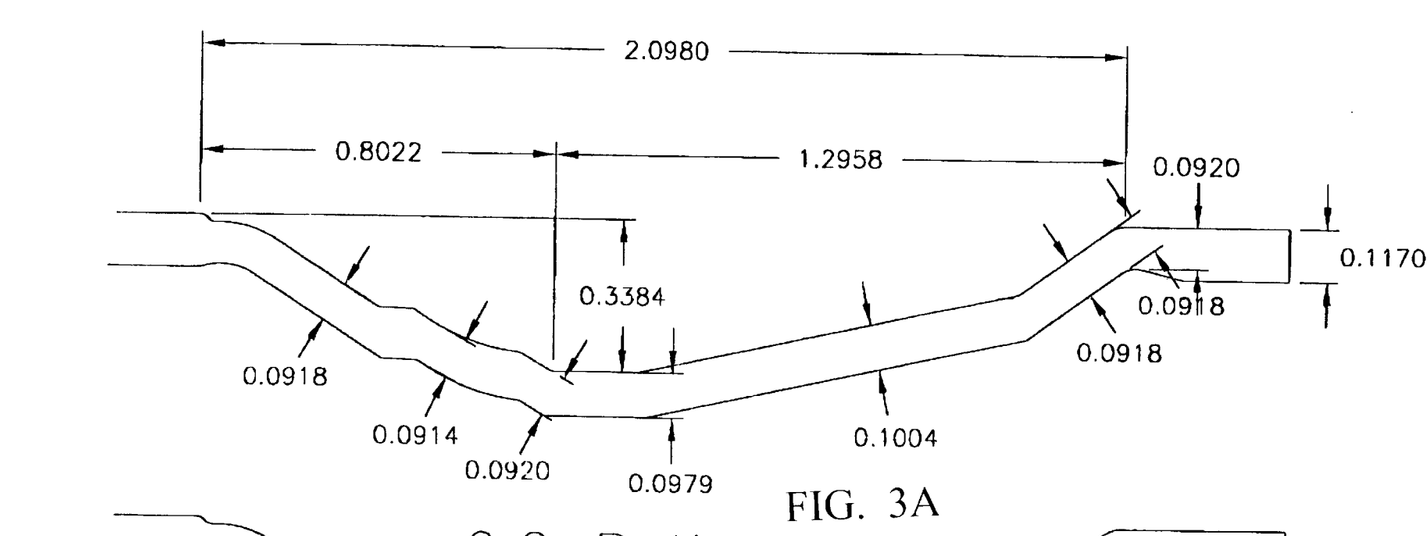
FIG. 3A is a side (profile), partially broken-away view of another embodiment of a molded depression, similar to FIG. 2A, that includes a depression length to depth ratio of 6.2, and an interior inclined wall having curved and planar contours in its surface, capable of forming a portion of the article of FIG. 1.
Figure 4A:
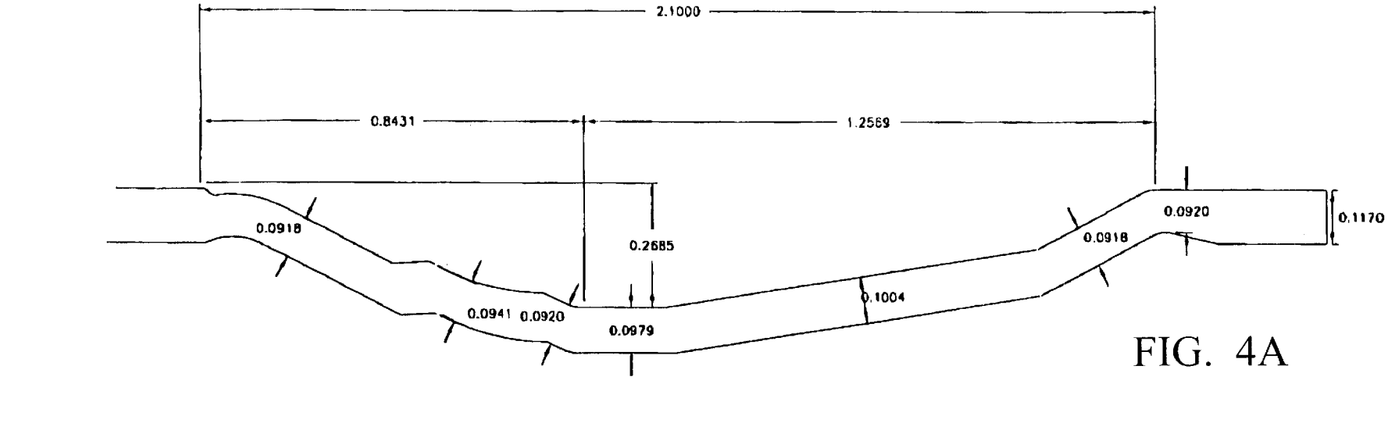
FIG. 4A is a side (profile), partially broken-away view of another embodiment of a molded depression, similar to FIG. 2A, that includes a depression length to depth ratio of 8.2, and an interior inclined wall having curved and planar contours in its surface, forming a portion of the article of FIG. 1.

The depression profile 20 of the preferred embodiment, shown in FIG. 2A, as well as the depression profiles shown in FIGS. 3A and 4A, provides new nesting or stacking capabilities for shipping and storage, without damage, never before achieved in a molded composite wood article having one or more depression-interior inclined surfaces, in comparison to the limited nesting capability of the prior art Colonist® design shown in FIG. 3B of U.S. Pat. No. 5,543,234.

Figure 2B:
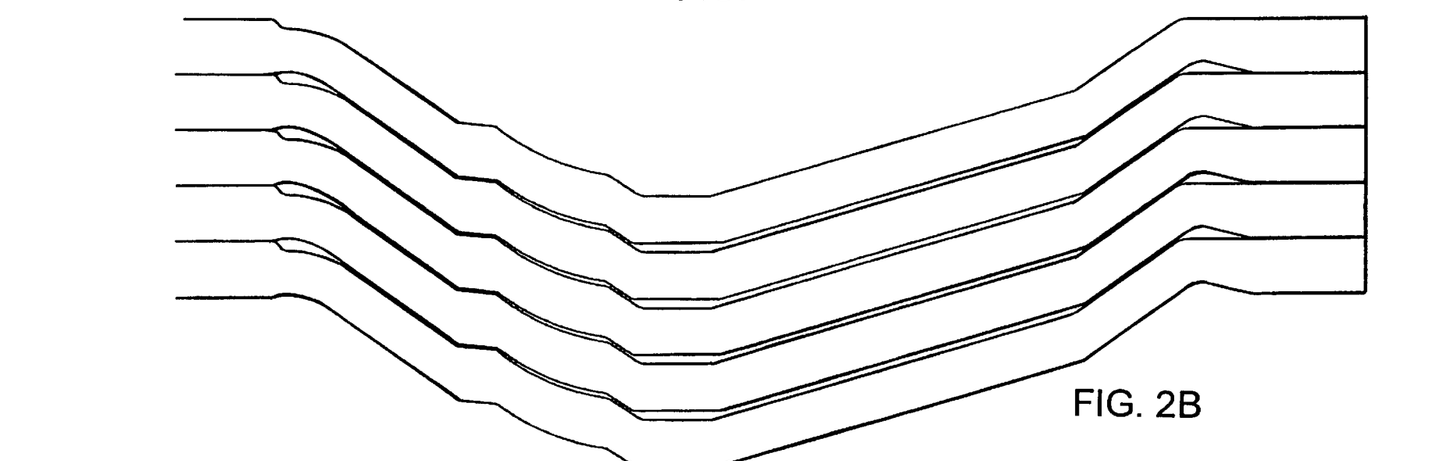
FIG. 2B is a side (profile), partially broken-away view of a plurality of the molded depressions of FIG. 2A stacked, one above another, without contact at the inclined depression walls.
Figure 3B:
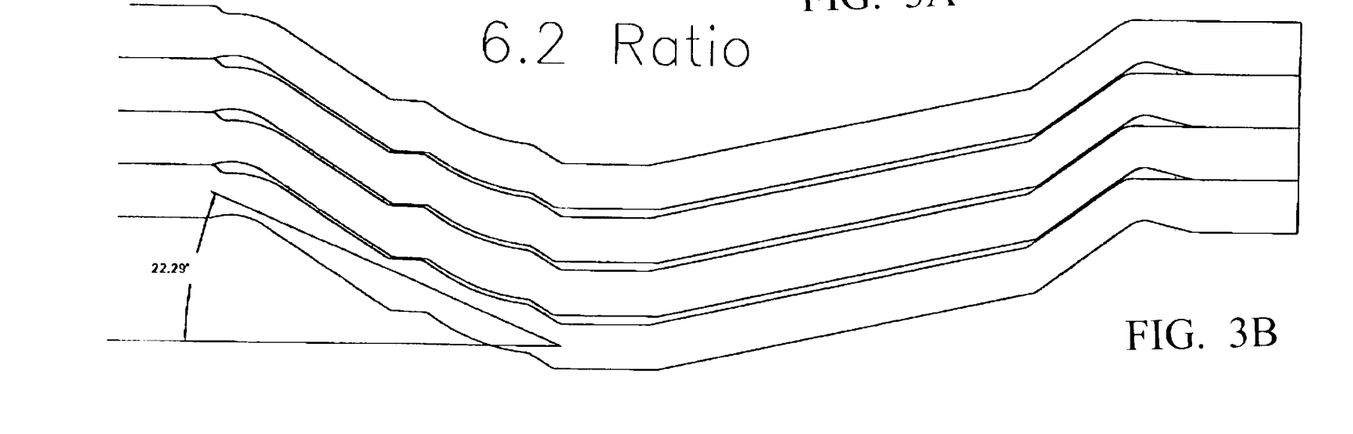
FIG. 3B is a side (profile), partially broken-away view of a plurality of the molded depressions of FIG. 3A stacked, one above another, without contact at the inclined depression walls.
Figure 4B:
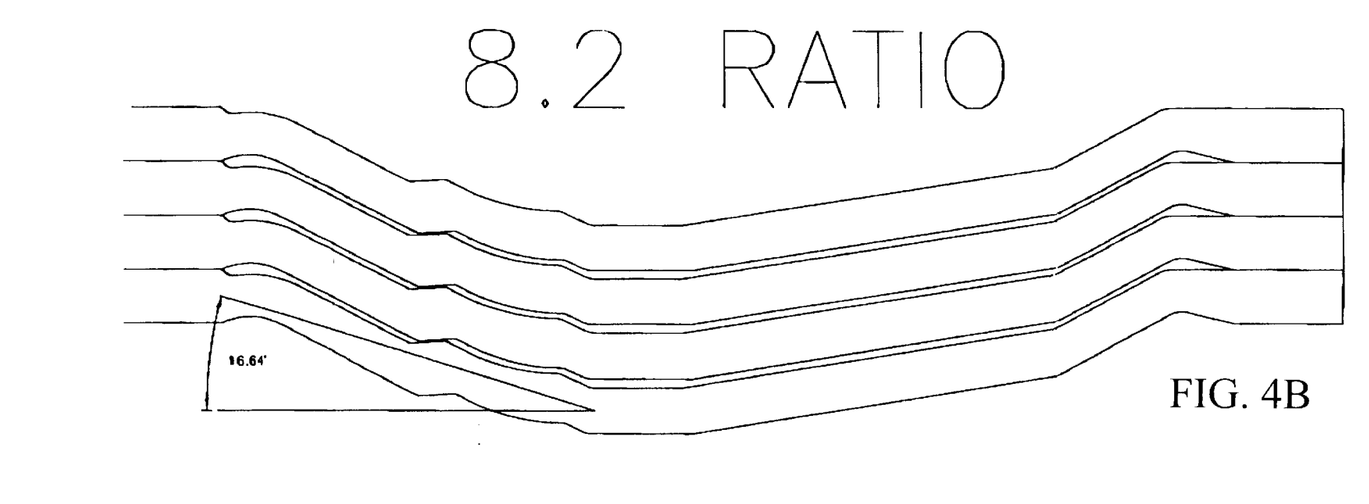
FIG. 4B is a side (profile), partially broken-away view of a plurality of the molded depressions of FIG. 4 stacked, one above another, without contact at the inclined depression walls.
Figure 5:
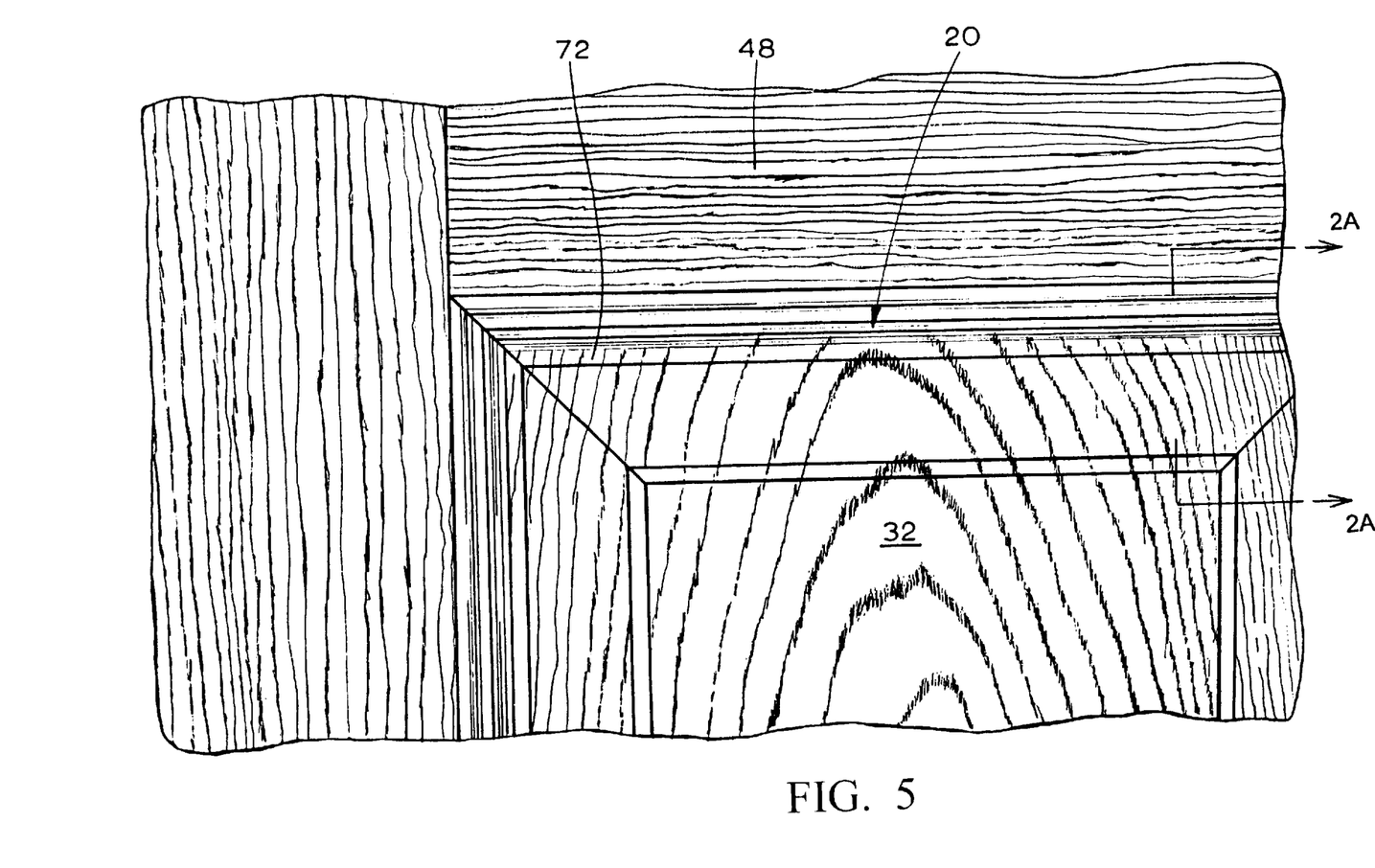
FIG. 5 is a partially broken-away, enlarged top view of a depression portion of the molded door skin shown as a top layer of the door of FIG. 1.

The inclined wall 60 shown in FIGS. 2A, 3A and 4A are inclined at about 15° to about 35° off the horizontal, preferably about 15° to about 2820 , more preferably about 15° to about 25°, as shown in FIGS. 2B, 3B and 4B, and is thinner than the horizontals 48 and 32 to avoid contact during shipping. This allows any two molded articles, e.g., door skins 11, to always come into the same resting position in relationship to each other when stacking, without any contact at the inclined walls 60 and 61, in FIG. 2B with space therebetween in all areas except at the horizontal ends 32 and 48.

The aesthetic appearance of the inclined, depression-interior wall 60 (FIG. 2A) has been maintained by keeping major visual elements of shadow, depth, and width in close proportion to the original Colonist design.

Some of the unique features of the improved depression-interior inclined wall profile shown in FIG. 2A, include
1. Uniform density improving yields out-of-press with no blistering;
2. Uniform density reducing surface damage on bottom skins after unitization;
3. Improved stacking that provides a gap between skins, over the entire span of inclined walls 60 and 61;
4. Decreased surface contact of stacked articles—contact being made only on distal horizontal portions of the articles allowing more loading weight during shipping to be applied without experiencing product damage such as burnishing or scuffing;
5. Uniform density allowing for possible paint coverage reduction;
6. Excellent prestained coating properties;

7. Improved woodgrain fidelity based on reduced fill in the embossing pattern (called ticking) resulting from the lower draft angle and reduced paint coverage;
8. Improved shipping and warehousing safety through better stacking stability (reduces potential for tipping or falling as handled in inventory);
9. Reduced packaging costs by improving skin to skin stacking stability, units become self supporting; and
10. Maintaining aesthetic continuity with the Colonist design, through similar proportional detailing with shadow-highlights and profile depth.

The articles, and method of manufacture, described herein are most advantageously formed from a substrate that includes at least a surface layer of cellulosic fiber and a binder, e.g., a fiberboard mat and a resin binder, or cellulosic wood particles and a resin binder. It will be appreciated by those skilled in the art, however, that similar articles can be formed by molding, extruding or otherwise contouring upper and lower major surfaces, as described herein, from thermoplastic or thermosetting polymers, e.g., polyethylene or polypropylene with or without reinforcing fibers, such as fiberglass, while incorporating the substantially better nesting capability, and the substantially easier inclined surface texturing advantage for the contoured upper surface of depression-interior walls.

It will be understood that the present disclosure has been made only by way of preferred embodiments and that numerous changes in details of construction, combination, and arrangement of parts can be resorted to without departing from the spirit and scope of the invention as hereunder claimed.

What is claimed and sought to be secured by Letters Patent of the United States is:

What is claimed is:

1. A method of manufacturing a consolidated, manmade molded wood article having a molded surface portion containing at least about 80% by weight cellulosic material and sufficient binder to adhere the cellulosic material together into a structurally sound article comprising:
    disposing a composite layer of said cellulosic material and said binder in a contoured mold cavity;
    compressing the composite layer, in the mold cavity, to subject the composite layer to sufficient heat and pressure in the mold cavity to contour upper and lower major surfaces of the composite layer to correspond in shape to the contours of the mold cavity and to bind the composite layer together into a consolidated, manmade molded wood article;
    molding said molded wood article in said mold cavity to include a planar wall having an upper surface adjacent to a molded depression, said depression including an inclined wall having a contoured upper surface integral with an upper surface of said planar wall, said inclined wall extending downwardly from said planar wall, toward a bottom of the depression, to a lower end of the inclined upper wall surface, said inclined wall being thinner over its entire span than a thickness of horizontal portions of said article at distal ends of said inclined wall, said depression having a length to depth ratio in the range of about 5.0 to about 8.5, such that a plurality of said molded wood composite articles can nest, one above another for transport, with contact only at said horizontal end portions that extend horizontally from said inclined wall, without damage to said articles.

2. A method according to claim 1, wherein the composite layer of cellulosic material and a binder comprises a mat, of essentially constant thickness, of fibrillated cellulosic fibers and a binder selected from the group consisting of a phenol-formaldehyde resin, a urea-formaldehyde resin, and mixtures thereof.

3. A method according to claim 2, wherein the resin binder is included in the mat in an amount of about 2% to about 15% based on the total weight of the mat, dry basis.

4. A method according to claim 3, wherein the mold cavity is heated to a temperature in the range of about 275° F. to about 550° F. and presses the mat at a pressure of about 400 psi to about 850 psi.

5. A method according to claim 4, wherein the mat is molded at a temperature in the range of about 275° F. to about 550° F. and at a pressure in the range of about 400 psi to about 850 psi for a period of time of about 20 seconds to about 20 minutes.

6. A method according to claim 1, wherein molding is accomplished while essentially completely preventing the escape of gas from the mold cavity until the mold cavity is opened.

7. A method according to claim 1, wherein the composite layer of cellulosic material comprises wood particles and a binder resin, and contains 10% by weight or less moisture, when molded, based on the dry weight of the composite layer.

8. A method according to claim 1, wherein the mold cavity comprises a plurality of said depressions, simulating a multi-panel door surface.

9. A method according to claim 1, wherein said contoured surface of said depression-interior inclined wall is contoured in a bead and cove pattern between the upper and lower ends thereof.

10. A method according to claim 1, wherein the specific gravity of said inclined wall, along said span, is the range of about 0.90 to about 1.10.

11. A method according to claim 1, wherein the inclined wall is at an angle, from horizontal, in the range of about 10° to about 40°.

12. A method according to claim 11, wherein the inclined wall is at an angle, from horizontal, in the range of about 15° to about 30°.

13. A method according to claim 12, wherein the inclined wall is at an angle, from horizontal, in the range of about 15° to about 28°.

14. A method according to claim 1, wherein the article includes a plurality of said molded depressions formed in a rectangular shape, and each depression including four of said inclined walls, each inclined wall integral with two other of said four inclined walls, and wherein a bottom surface of said depression, between said inclined walls, includes a horizontal wall portion integral with a planar inclined wall portion that extends upwardly from said horizontal bottom surface of said depression to a planar panel, disposed between said contoured inclined walls and in a common plane with said planar wall that is integral with an upper surface of said contoured, inclined wall.

15. A method of manufacturing a molded wood article having a molded surface portion containing at least about 80% by weight cellulosic material and sufficient binder to adhere the cellulosic material together into a structurally sound article comprising:
    disposing a composite layer of said cellulosic material and said binder in a contoured mold cavity;
    closing the mold cavity to subject the composite layer to sufficient heat and pressure in the mold cavity to contour upper and lower major surfaces of the composite layer to correspond in shape to the contours of the mold cavity and to bind the composite layer together into a molded wood article;

molding said molded wood article in said mold cavity to include a planar wall having an upper surface adjacent to a molded depression, said molded depression including an inclined wall having a contoured upper surface integral with a horizontal upper surface of said planar wall, said inclined wall extending downwardly from said planar wall, toward a bottom of the depression, to a lower end of the inclined wall, said inclined wall including contoured surface portions, wherein a thickness of said inclined wall, over the entire span between upper and lower ends of said inclined wall, is less than a thickness of said adjacent planar wall, and wherein the molded depression has a length to depth ratio in the range of about 5.0 to about 8.5.

16. A method according to claim 15, wherein the composite layer of cellulosic material and a binder comprises a mat, of essentially constant thickness, of fibrillated cellulosic fibers and a binder selected from the group consisting of a phenol-formaldehyde resin, a urea-formaldehyde resin, and mixtures thereof.

17. A method according to claim 16, wherein the resin binder is included in the mat in an amount of about 1% to about 15% based on the total weight of the mat, dry basis.

18. A method according to claim 17, wherein the mold cavity is heated to a temperature in the range of about 275° F. to about 550° F. and presses the mat at a pressure of about 400 psi to about 850 psi.

19. A method according to claim 15, wherein the composite layer of cellulosic material comprises wood particles and a binder resin, and contains 10% or less moisture, when molded, based upon the dry weight of the composite layer.

20. A method according to claim 15, wherein the mold cavity comprises a plurality of said depressions, simulating a multi-panel door surface.

21. A method according to claim 15, wherein the molded depression has a length to depth ratio of about 5.2 to about 6.2.

22. A decorative article of manufacture capable of nesting, one article above another, for transport without significant surface damage, said article comprising:

a first planar wall surrounding an integral depression, said depression including a second planar wall, within the depression, and an inclined wall, within the depression and integral with both the first and second planar walls at spaced ends of said inclined wall;

said inclined wall having an upper surface integral with an upper surface of said first and second planar walls, said inclined wall being thinner over its entire span than a thickness of said first and second planar walls, and said depression having a length to depth ratio in the range of about 5.0 to about 8.5.

23. The decorative article of claim 22, wherein said inclined wall has a thickness that is about 2% to about 15% less than a thickness of the first and second planar walls.

24. The decorative article of claim 23, wherein said inclined wall has a thickness that is about 3% to about 10% less than a thickness of the first and second planar walls.

25. The decorative article of claim 24, wherein said inclined wall has a thickness that is about 5% to about 8% less than a thickness of the first and second planar walls.

26. The decorative article of claim 22, wherein the depression has a length to depth ratio in the range of about 5.2 to about 8.2.

27. A consolidated, man-made molded wood article having a molded surface portion containing at least about 80% by weight cellulosic material and sufficient binder to adhere the cellulosic material together into a structurally sound article comprising:

a composite layer of said cellulosic material and said binder having contoured upper and lower major surfaces bound together into a consolidated, man-made molded wood article;

said article including a planar wall having an upper surface adjacent to a molded depression, said depression including an inclined wall having a contoured upper surface integral with an upper surface of said planar wall, said inclined wall extending downwardly from said planar wall, toward a bottom of the depression, to a lower end of the inclined upper wall surface, said inclined wall being thinner than said planar wall over the entire span of said inclined wall, said molded depression having a length to depth ratio in the range of about 5.0 to about 8.5, and wherein a plurality of said molded wood composite articles can nest, one above another for transport, without contact between stacked articles at said inclined wall.

28. An article according to claim 25, wherein the composite layer of cellulosic material and a binder comprises a mat, of essentially constant thickness, of fibrillated cellulosic fibers and a binder selected from the group consisting of a phenol-formaldehyde resin, a urea-formaldehyde resin, and mixtures thereof.

29. A method according to claim 26, wherein the resin binder is included in the mat in an amount of about 1% to about 15% based on the total weight of the mat, dry basis.

30. An article according to claim 27, wherein the article includes a plurality of said depressions, simulating a multi-panel door surface.

31. An article according to claim 25, wherein said contoured surface of said depression-interior inclined wall is contoured in a bead and cove pattern between upper and lower ends thereof.

32. An article according to claim 25, wherein the article includes a plurality of said molded depressions formed in a rectangular shape, and each depression including four of said inclined walls, each inclined wall being integral with two other of said four inclined walls, and wherein a bottom surface of said depression, between said inclined walls, includes a horizontal wall portion integral with an inclined wall portion that extends upwardly from said horizontal bottom surface of said depression to a planar portion, disposed between said contoured inclined walls and in a common plane with said planar wall that is integral with an upper surface of said contoured, inclined wall.

* * * * *